United States Patent
Sung

(10) Patent No.: US 6,445,160 B1
(45) Date of Patent: Sep. 3, 2002

(54) METHOD FOR CONTROLLING BATTERY CHARGING OF ELECTRIC VEHICLE

(75) Inventor: Ki-Taek Sung, Anyang (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/003,274

(22) Filed: Dec. 6, 2001

(30) Foreign Application Priority Data

Dec. 13, 2000 (KR) ........................................ 2000-76028

(51) Int. Cl.[7] ................ H02J 7/00; H02J 7/14
(52) U.S. Cl. ...................... 320/119; 320/162
(58) Field of Search ................ 320/132, 162, 320/134, 116, 120, 121, 122, 124, 125

(56) References Cited

U.S. PATENT DOCUMENTS 6,239,579 B1 * 5/2001 Dunn et al. .................. 320/119
6,331,761 B1 * 12/2001 Kumar et al. ................ 320/132

* cited by examiner

Primary Examiner—Gregory Toatley
(74) Attorney, Agent, or Firm—Antonelli, Terry, Stout & Kraus, LLP

(57) ABSTRACT

Disclosed herein is a method for controlling the battery charging of an electric vehicle. In the battery charging control method, first of all, if the voltage of the battery modules satisfies first failure criteria in a charging mode, it is determined whether the voltage of battery modules satisfies second failure criteria less strict than the first failure criteria. If yes, the state of a battery is considered as a battery failure and the battery is not charged. If no, the battery is charged for a certain period of time on the charging condition of a failure mode stricter than the charging condition of a normal mode. Thereafter, it is determined whether the voltage of the battery modules measured after the performance of the failure mode charging satisfies the first failure criteria. If yes, the state of the battery is considered as a failure and the battery is not charged. If no, the battery is charged on the charging condition of the normal mode.

1 Claim, 3 Drawing Sheets

METHOD FOR CONTROLLING BATTERY CHARGING OF ELECTRIC VEHICLE

BACKGROUND OF THE INVENTION

1. Field of the Invention

The present invention relates generally to an electric vehicle, and more particularly to a method for controlling the battery charging of an electric vehicle, in which if a battery is determined as a failure according to a conventional first failure criteria in a charging mode, the battery is inspected according to a second failure criteria less strict than the conventional first failure criteria and the battery charging is performed according to the result of the inspection.

2. Description of the Prior Art

Current automobile engines utilize energy obtained by burning fossil fuel in cylinders as their power, so exhaust gas generated in the cylinders includes harmful substances such as $NO_x$, HC, CO, etc. These substances pollute the atmosphere and do harm to human beings, resulting in an environmental pollution problem.

Recently, electric vehicles that can resolve the aforementioned pollution problem have been developed and used. Such an electric vehicle includes a battery, a controller, a motor, a driving gear, etc. The electric vehicle is operated in such a way that the motor is driven by power from the charged battery and the driving gear is operated by power from the motor.

In such a case, in the battery of the electric vehicle, a plurality of cells constitute a battery module (12V), and a plurality of such battery modules constitute a battery pack so as to meet the required voltage of a driving source.

FIG. 1 is a flowchart showing a method for controlling the battery charging of a conventional electric vehicle. First of all, the voltage of the battery pack comprised of a plurality of battery modules is detected at a step S1. Subsequently, the average voltage (Vb_avg) of battery modules is calculated by dividing the voltage of the battery pack by the number of the battery modules constituting the battery pack at a step S2. Thereafter, a variable 'i' is set for '0' at a step S3, where the variable 'i' designates a battery module number.

Subsequently, a difference value (Vb_module(i)·Vb_avg) between the voltage (Vb_module(i)) of the battery modules and the average voltage (Vb_avg) is compared to a predetermined reference difference value (Vdiff_cut) at a step S4. If the difference value (Vb_module (i)·Vb_avg) is equal to or greater than the reference difference value (Vdiff_cut), a step S10 is performed; while if the difference value (Vb_module (i)·Vb_avg) is equal to or less than the reference difference value (Vdiff_cut), a step S5 is performed.

The voltage (Vb_module (i)) of the battery modules is respectively compared to a preset maximum failure reference voltage value (Vb_max) and a preset minimum failure reference voltage value (Vb_min) at the step S5. If the voltage (Vb_module (i)) of battery modules is equal to or greater than the maximum failure reference voltage value (Vb_max), or equal to or less than the minimum failure reference voltage value (Vb_in), the step S10 is performed; while if the voltage (Vb_module (i)) of battery modules is less than the maximum failure reference voltage value (Vb_max) and greater than the minimum failure reference voltage value (Vb_Min), a step S6 is performed.

The voltage (Vb_module (i)) of the battery modules is respectively compared to a preset maximum warning reference voltage value (Vb_warn_max) and a preset minimum warning reference voltage value (Vb_warn_min) at the step S6. If the voltage (Vb_module (i)) of the battery modules is equal to or greater than the maximum warning reference voltage value (Vb_warn_max), or equal to or less than the minimum warning reference voltage value (Vb_warn_min), a step S7 is performed; while if the voltage (Vb_module (i)) of the battery modules is less than the maximum warning reference voltage value (Vb_warn_max) and greater than the minimum warning reference voltage value (Vb_warn_min), a step S8 is performed.

Battery warning is set at the step S7. In this case, if the number of the warned battery modules is greater than a certain number (for example, three), the control process of the battery failure is performed.

Subsequently, a variable 'i' is increased by adding "1" to the variable 'i' at the step S8. It is determined whether the value of the variable 'i' is greater than the value obtained by subtracting 1 from the number of the battery modules at a step S9. If the value of the variable 'i' is greater than the value obtained by subtracting '1' from the number of the battery modules, the procedure returns to a main routine for controlling the entire state of the electric vehicle; while if the value of the variable 'i' is equal to or smaller than the value obtained by subtracting '1' from the number of the battery modules, the procedure returns to the step S4.

That is, the steps S3, S8 and S9 are provided for sequentially performing the steps S4 to S7 in regard to all the battery modules constituting the battery pack.

Battery failure is set at the step S10, and, in this case, both driving and charging are impossible.

However, in the above-mentioned conventional battery charging method for an electric vehicle, when only one battery module fails, both driving and charging are impossible. At this time, if the battery is left for a certain period of time without repair, there occurs a problem that even normal battery modules except for the failed battery module are deteriorated due to deep discharging caused by self-discharging.

SUMMARY OF THE INVENTION

Accordingly, the present invention has been made keeping in mind the above problems occurring in the prior art, and an object of the present invention is to provide a method for controlling the battery charging of an electric vehicle, in which if a battery is determined as a failure according to a conventional first failure criteria in a charging mode, the battery is inspected according to a second failure criteria less strict than the conventional first failure criteria and the battery charging is performed according to the result of the inspection, so the battery can be charged when a part of battery modules fail, thereby preventing the performance of normal battery modules from being deteriorated due to deep discharging by self-discharging.

In order to accomplish the above object, the present invention provides a method for controlling the battery charging of an electric vehicle, comprising the steps of: determining whether the voltage of battery modules satisfies second failure criteria less strict than first failure criteria, if the voltage of the battery modules satisfies the first failure criteria in a charging mode; considering the state of a battery as a battery failure and not charging the battery, if the voltage of the battery modules satisfies the second failure criteria; charging the battery for a certain period of time on the charging condition of a failure mode stricter than the charging condition of a normal mode, if the voltage of the battery modules does not satisfy the second failure criteria; determining whether the voltage of the battery modules measured after the performance of the failure mode charging satisfies the first failure criteria; considering the state of a battery as a failure and not charging the battery, if the voltage of the battery modules measured after the performance of the failure mode charging satisfies the first failure criteria; and charging the battery on the charging condition of the normal mode, if the voltage of the battery modules measured after the performance of the failure mode charging does not satisfy the first failure criteria.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
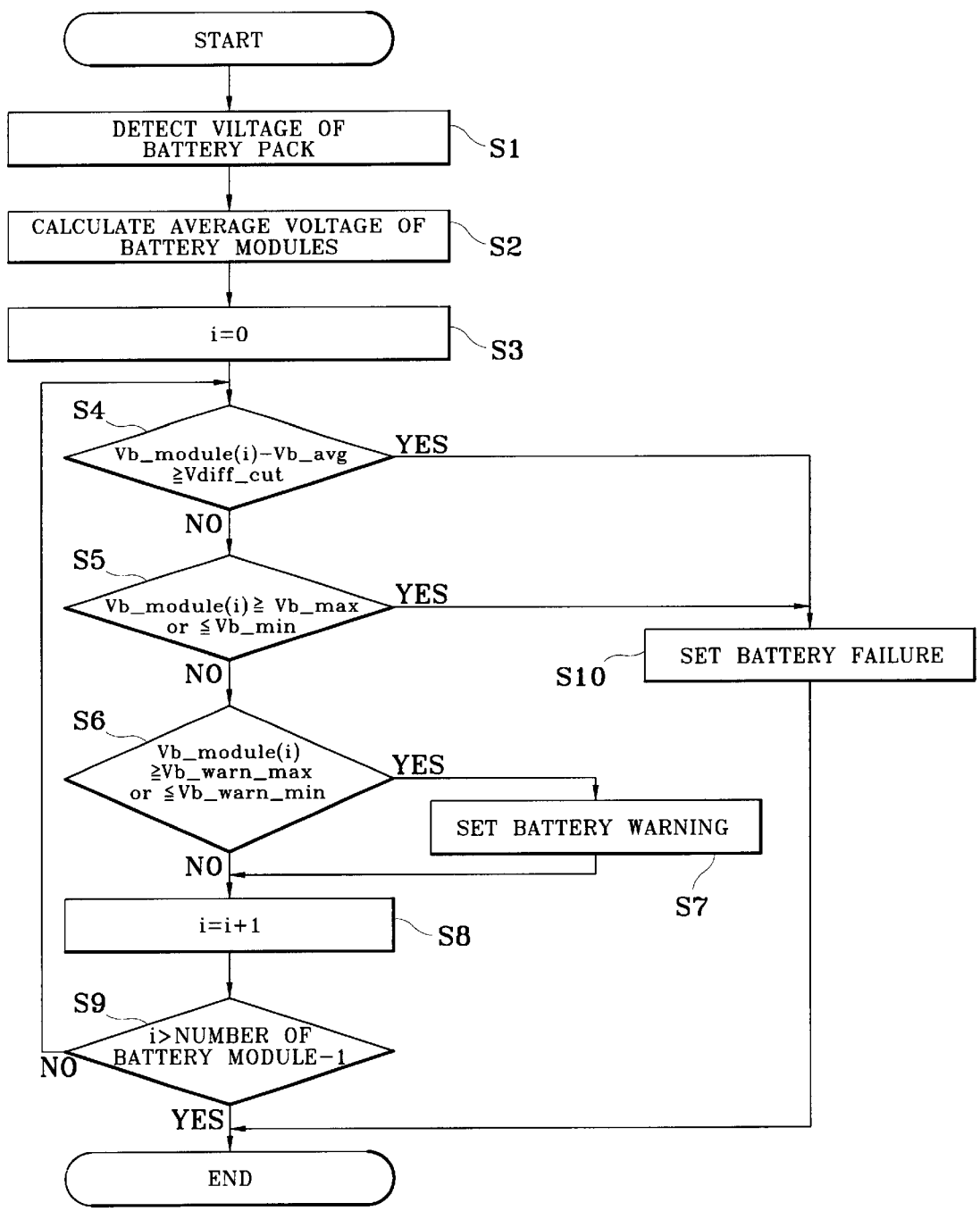
FIG. 1 is a flowchart showing a conventional method for controlling the battery charging of an electric vehicle.
Figure 2:
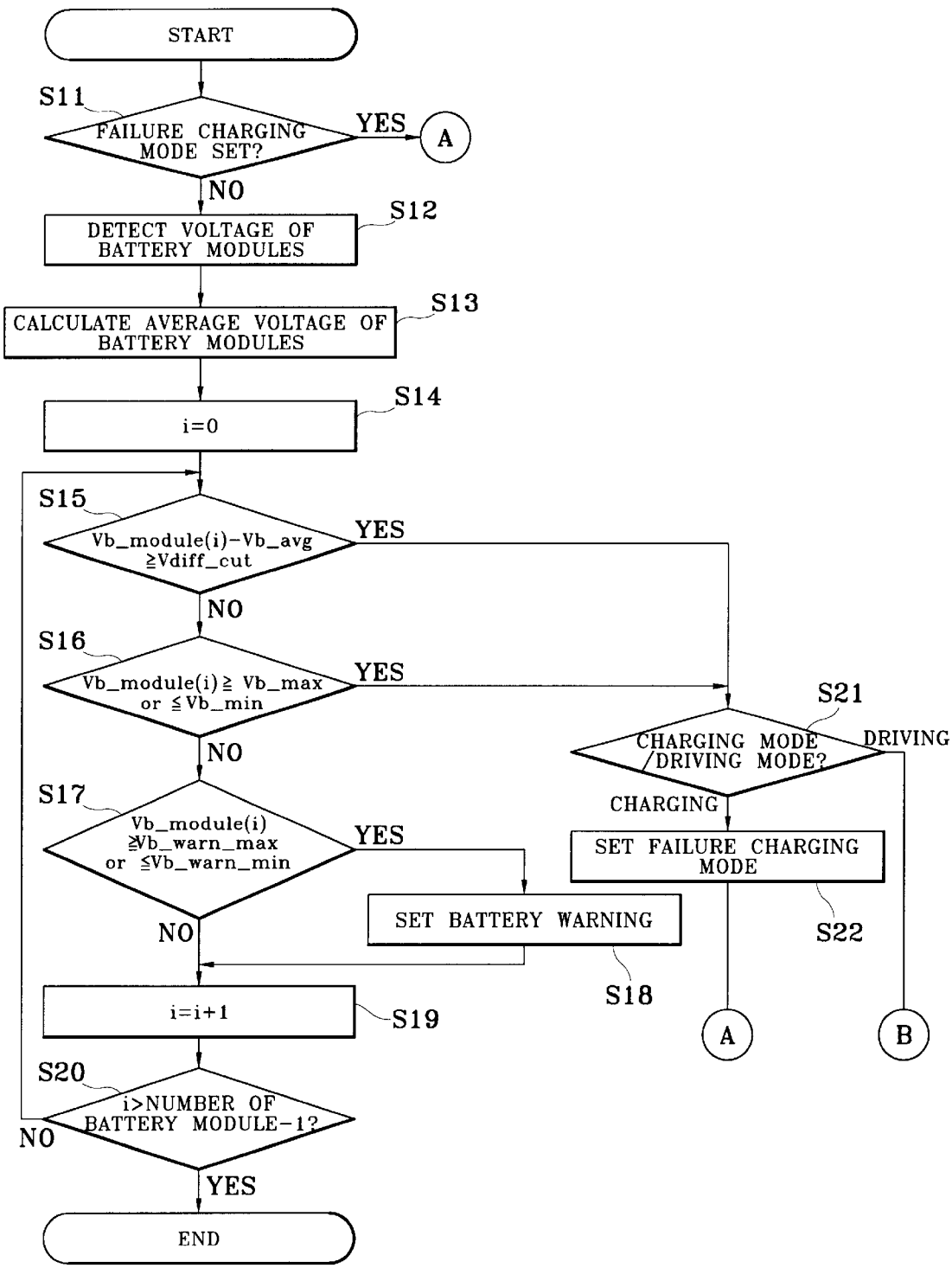
FIGS. 2 and 3 are flowcharts showing a method for controlling the battery charging of an electric vehicle in accordance with a preferred embodiment of the present invention.
Figure 3:
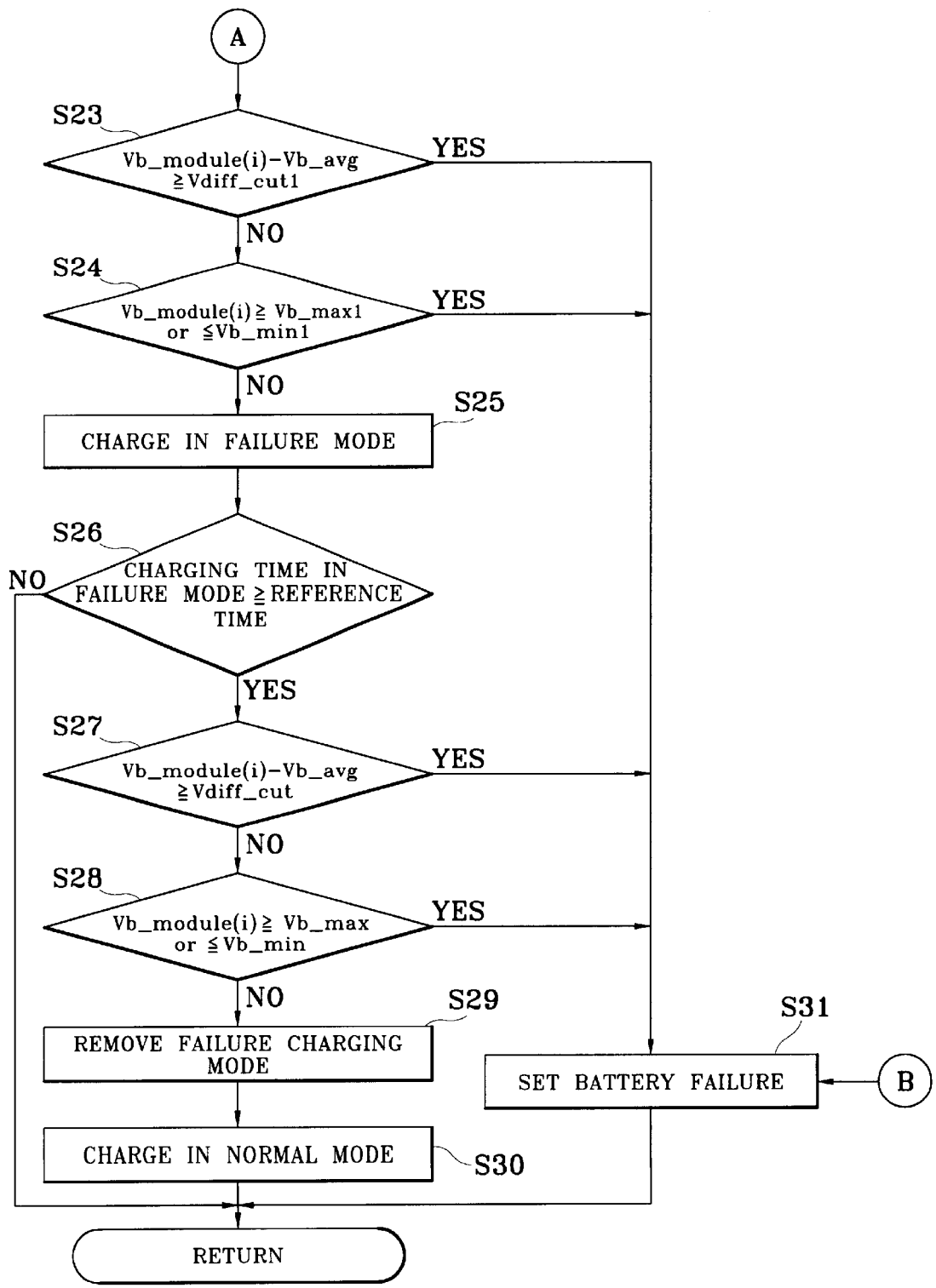

FIGS. 2 and 3 are flowcharts showing a method for controlling the battery charging of an electric vehicle in accordance with a preferred embodiment of the present invention.

As shown FIG. 2, it is determined whether a failure charging mode is set at a step S11. If the failure charging mode is set, a step S23 is performed; while if the failure charging mode is not set, a step S12 is performed. In this case, if the voltage of the battery modules satisfies a first failure criteria, the failure charging mode is set; if the voltage of the battery modules measured after performing failure mode charging does not satisfy the first failure criteria, the failure charging mode is cancelled.

The voltage of the battery pack comprised of a plurality of battery modules is detected at the step S12. Subsequently, the average voltage (Vb_avg) of the battery modules is calculated by dividing the voltage of the battery pack by the number of the battery modules constituting the battery pack at a step S13. A variable 'i' is set for '0' at a step S14, where the variable 'i' designates a battery module number.

Subsequently, a difference value (Vb_module (i)·Vb_avg) between the voltage (Vb_module (i)) of the battery modules and the average voltage (Vb_avg) is compared to a preset reference difference value (Vdiff_cut) at a step S15. If the difference value (Vb_module (i)·Vb_avg) is equal to or greater than the reference difference value (Vdiff_cut), a step S21 is performed; while if the difference value (Vb_module (i)·Vb_avg) is equal to or less than the reference difference value (Vdiff_cut), a step S16 is performed.

The voltage (Vb_module (i)) of the battery modules is respectively compared to a preset maximum failure reference voltage value (Vb_max) and a preset minimum failure reference voltage value (Vb_min) at the step S16. If the voltage (Vb_module (i)) of the battery modules is equal to or greater than the maximum failure reference voltage value (Vb_max), or equal to or less than the minimum failure reference voltage value (Vb_min), the step S21 is performed; while if the voltage (Vb_module (i)) of the battery modules is less than the maximum failure reference voltage value (Vb_max) and greater than the minimum failure reference voltage value (Vb_min), a step S17 is performed.

The voltage (Vb_module (i)) of the battery modules is respectively compared to a preset maximum warning reference voltage value (Vb_warn_max) and a preset minimum warning reference voltage value (Vb_warn_min) at the step S17. If the voltage (Vb_module (i)) of the battery modules is equal to or greater than the maximum warning reference voltage value (Vb_warn_max), or equal to or less than the minimum warning reference voltage value (Vb_warn_min), a step S18 is performed; while if the voltage (Vb_module (i)) of the battery modules is less than the maximum warning reference voltage value (Vb_warn_max) and greater than the minimum warning reference voltage value (Vb_warn_min), a step S19 is performed.

Battery warning is set at the step S18. In this case, if the number of the warned battery modules is greater than a certain number (for example, three), the control process of the battery failure is performed.

Subsequently, a variable 'i' is increased by adding '1' to the variable 'i' at the step S19. It is determined whether the value of the variable 'i' is greater than the value obtained by subtracting '1' from the number of the battery modules at a step S20. If the value of the variable 'i' is greater than the value obtained by subtracting '1' from the number of the battery modules, the procedure returns to a main routine for controlling the entire state of the electric vehicle; while if the value of the variable 'i' is equal to or smaller than the value obtained by subtracting '1' from the number of the battery modules, the procedure returns to the step S15.

That is, the steps S14, S19 and S20 are provided for sequentially performing the steps S15 to S18 in regard to all the battery modules constituting the battery pack.

Meanwhile, it is determined whether current mode is a charging mode or driving mode at the step S21. If the current mode is the charging mode, a step S22 is performed; while if the current mode is the driving mode, a step S31 is performed. At the step S22, a failure charging mode is set.

Subsequently, at the step S23, the difference value (Vb_module (i)·Vb_avg) between the voltage (Vb_module (i)) of the battery modules and the average voltage (Vb_avg) is compared to a preset second reference difference value (Vdiff_cut1) that is set to be higher than the first reference difference value (Vdiff_cut). If the difference value (Vb_module (i)·Vb_avg) is equal to or greater than the second reference difference value (Vdiff_cut1), a step S31 is performed; while if the difference value (Vb_module (i)·Vb_avg) is equal to or less than the second reference difference value (Vdiff_cut1), a step S24 is performed.

The voltage (Vb_module (i)) of the battery modules is respectively compared to a preset second maximum failure reference voltage value (Vb_max1) set to be higher than the first maximum failure reference voltage value (Vb_max) and a preset second minimum failure reference voltage value (Vb_min1) set to be lower than the first minimum failure reference voltage value (Vb_min) at the step S24. If the voltage (Vb_module (i)) of the battery modules is equal to or greater than the second maximum failure reference voltage value (Vb_max1), or equal to or less than the second minimum failure reference voltage value (Vb_min1), a step S31 is performed; while if the voltage (Vb_module (i)) of the battery modules is less than the second maximum failure reference voltage value (Vb_max1) and greater than the second minimum failure reference voltage value (Vb_min1), a step S25 is performed.

The battery is charged on the charging condition of a failure mode stricter than the charging condition of a normal mode at the step S25. That is, the charging condition is caused to be stricter in such a way that the amount of the charging current is lowered in comparison with that of the charging condition of the normal mode, the charging limitation temperature of the battery is lowered in comparison with that of the charging condition of the normal mode, or the like.

Subsequently, it is determined whether a battery charging time for which the battery has been charged on the charging condition of the failure charging mode is equal to or greater than a reference time at a step S26. If the battery charging time is equal to or greater than the reference time, a step S27 is performed; while the battery charging time is less than the reference time, the procedure returns to a main routine for controlling the entire state of the electric vehicle.

Subsequently, a difference value (Vb_module (i)·Vb_avg) between the voltage (Vb_module (i)) of the battery modules and the average voltage (Vb_avg) is compared to the first reference difference value (Vdiff_cut) at the step S27. If the difference value (Vb_module (i)·Vb_avg) is equal to or greater than the first reference difference value (Vdiff_cut), a step S31 is performed; while if the difference value (Vb_module (i)·Vb_avg) is less than the first reference difference value (Vdiff_cut), a step S28 is performed.

The voltage (Vb_module (i)) of the battery modules is respectively compared to the preset first maximum failure reference voltage value (Vb_max) and the preset first minimum failure reference voltage value (Vb_min) at the step S28. If the voltage (Vb_module (i)) of the battery modules is equal to or greater than the first maximum failure reference voltage value (Vb_max), or equal to or less than the first minimum failure reference voltage value (Vb_min), a step S31 is performed; while if the voltage (Vb_module (i)) of the battery modules is less than the first maximum failure reference voltage value (Vb_max) and greater than the first minimum failure reference voltage value (Vb_min), a step S29 is performed.

At the step S29, the failure charging mode is removed. At a step S30, the battery is charged under the charging condition of the normal mode. At the step S31, the battery failure is set, and, at this time, both driving and charging are impossible.

As described above, the present invention provides a method for controlling the battery charging of an electric vehicle, in which if a battery is determined as a failure according to a conventional first failure criteria in a charging mode, the battery is inspected according to a second failure criteria less strict than the conventional first failure criteria and the battery charging is performed according to the result of the inspection, so the battery can be charged when a part of battery modules fail, thereby preventing the performance of normal battery modules from being deteriorated due to deep discharging by self-discharging.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling the battery charging of an electric vehicle, comprising the steps of:

determining whether the voltage of battery modules satisfies second failure criteria less strict than first failure criteria, if the voltage of the battery modules satisfies the first failure criteria in a charging mode;

considering the state of a battery as a battery failure and not charging the battery, if the voltage of the battery modules satisfies the second failure criteria;

charging the battery for a certain period of time on the charging condition of a failure mode stricter than the charging condition of a normal mode, if the voltage of the battery modules does not satisfy the second failure criteria;

determining whether the voltage of the battery modules measured after the performance of the failure mode charging satisfies the first failure criteria;

considering the state of a battery as a failure and not charging the battery, if the voltage of the battery modules measured after the performance of the failure mode charging satisfies the first failure criteria; and charging the battery on the charging condition of the normal mode, if the voltage of the battery modules measured after the performance of the failure mode charging does not satisfy the first failure criteria.

* * * * *